US011575718B2

United States Patent
Allen et al.

(10) Patent No.: US 11,575,718 B2
(45) Date of Patent: *Feb. 7, 2023

(54) PROVIDING SESSION INITIATION PROTOCOL REQUEST CONTENTS METHOD AND SYSTEM

(71) Applicant: BlackBerry Limited, Waterloo (CA)

(72) Inventors: Andrew Michael Allen, Hallandale Beach, FL (US); Jan Hendrik Lucas Bakker, Fort Worth, TX (US)

(73) Assignee: BlackBerry Limited, Waterloo (CA)

( * ) Notice: Subject to any disclaimer, the term of this patent is extended or adjusted under 35 U.S.C. 154(b) by 102 days.

This patent is subject to a terminal disclaimer.

(21) Appl. No.: 17/322,411

(22) Filed: May 17, 2021

(65) Prior Publication Data

US 2021/0273979 A1 Sep. 2, 2021

Related U.S. Application Data

(63) Continuation of application No. 16/514,756, filed on Jul. 17, 2019, now Pat. No. 11,038,930, which is a
(Continued)

(51) Int. Cl.
*H04L 65/1104* (2022.01)
*H04L 65/1016* (2022.01)
(Continued)

(52) U.S. Cl.
CPC ........ *H04L 65/1104* (2022.05); *H04L 51/046* (2013.01); *H04L 51/48* (2022.05);
(Continued)

(58) Field of Classification Search
CPC ... H04L 65/1104; H04L 51/046; H04L 51/48; H04L 65/1016; H04L 65/1069; H04L 67/142
See application file for complete search history.

(56) References Cited

U.S. PATENT DOCUMENTS 7,877,487 B2   1/2011  Cai et al.
8,081,586 B2  12/2011  Kiss
(Continued)

FOREIGN PATENT DOCUMENTS

EP       2106156 A1    9/2009
JP    2008016944 A     1/2008
(Continued)

OTHER PUBLICATIONS

European Extended Search Report; Application No. 13166385.8; dated Aug. 26, 2013; 9 pages.
(Continued)

*Primary Examiner* — Benjamin H Elliott, IV
(74) *Attorney, Agent, or Firm* — Conley Rose, P.C.; J. Robert Brown, Jr.

(57) ABSTRACT

An embodiment provides a user equipment that includes a processor configured to receive a Session Initiation Protocol (SIP) NOTIFY message transmitted by a network component as a result of a registration event. The SIP NOTIFY message contains at least a portion of information included in a first SIP message sent between a first user equipment and the network component. Another embodiment provides method and apparatus for a network node to determine whether filter criteria include one or more indicators that specify the need for information, and including in a second SIP message the information specified by the one or more indicators.

20 Claims, 4 Drawing Sheets

Related U.S. Application Data continuation of application No. 15/658,091, filed on Jul. 24, 2017, now Pat. No. 10,397,282, which is a continuation of application No. 14/992,720, filed on Jan. 11, 2016, now Pat. No. 9,723,029, which is a continuation of application No. 14/298,604, filed on Jun. 6, 2014, now Pat. No. 9,237,198, which is a continuation of application No. 13/680,789, filed on Nov. 19, 2012, now Pat. No. 8,787,371, which is a continuation of application No. 12/361,382, filed on Jan. 28, 2009, now Pat. No. 8,345,679.

(60) Provisional application No. 61/024,132, filed on Jan. 28, 2008.

(51) Int. Cl.
| | |
|---|---|
| *H04L 65/1069* | (2022.01) |
| *H04L 51/48* | (2022.01) |
| *H04L 67/142* | (2022.01) |
| *H04L 51/046* | (2022.01) |

(52) U.S. Cl.
CPC ...... *H04L 65/1016* (2013.01); *H04L 65/1069* (2013.01); *H04L 67/142* (2013.01)

(56) References Cited

U.S. PATENT DOCUMENTS

| | | | |
|---|---|---|---|
| 8,345,679 | B2 | 1/2013 | Allen et al. |
| 8,363,643 | B2 | 1/2013 | Kim et al. |
| 8,787,371 | B2 | 7/2014 | Allen et al. |
| 9,237,198 | B2 | 1/2016 | Allen et al. |
| 9,723,029 | B2 | 8/2017 | Allen et al. |
| 10,397,282 | B2 | 8/2019 | Allen et al. |
| 11,038,930 | B2 * | 6/2021 | Allen .................. H04L 51/046 |
| 2004/0184452 | A1 | 9/2004 | Huotari et al. |
| 2004/0243680 | A1 | 12/2004 | Mayer |
| 2005/0155036 | A1 | 7/2005 | Tiainen et al. |
| 2005/0193133 | A1 | 9/2005 | Niemi et al. |
| 2006/0123116 | A1 | 6/2006 | Rahman et al. |
| 2006/0140151 | A1 | 6/2006 | Dantu et al. |
| 2006/0149847 | A1 | 7/2006 | Meskauskas et al. |
| 2006/0245403 | A1 | 11/2006 | Kumar |
| 2007/0021138 | A1 | 1/2007 | Allen et al. |
| 2007/0043872 | A1 | 2/2007 | Pattan et al. |
| 2007/0071183 | A1 | 3/2007 | Shi |
| 2007/0177603 | A1 | 8/2007 | Calme et al. |
| 2007/0260739 | A1 | 11/2007 | Buckley et al. |
| 2007/0288754 | A1 | 12/2007 | Kaji et al. |
| 2008/0004061 | A1 | 1/2008 | Takeda |
| 2008/0046745 | A1 | 2/2008 | Buch et al. |
| 2008/0162705 | A1 | 7/2008 | Cai et al. |
| 2009/0011763 | A1 | 1/2009 | Torres |
| 2009/0041006 | A1 | 2/2009 | Chiu |
| 2009/0063649 | A1 | 3/2009 | Yamagishi |
| 2009/0164591 | A1 | 6/2009 | Chadli |
| 2010/0088421 | A1 | 4/2010 | Przybysz et al. |
| 2019/0342348 | A1 | 11/2019 | Allen et al. |
| 2021/0273979 | A1 * | 9/2021 | Allen .................. H04L 65/1016 |

FOREIGN PATENT DOCUMENTS

| | | |
|---|---|---|
| KR | 1020070019620 A | 2/2007 |
| WO | 2006117323 A1 | 11/2006 |
| WO | 2006125474 A1 | 11/2006 |
| WO | 2007009499 A1 | 1/2007 |
| WO | 2008089642 A1 | 7/2008 |

OTHER PUBLICATIONS

European Extended Search Report; Application No. 15152797.5; dated Sep. 23, 2015; 9 pages.

European Examination Report; Application No. 15152797.5; dated Apr. 16, 2018; 5 pages.

PCT International Search Report; Application No. PCT/US2009/048285; dated Jan. 27, 2010; 3 pages.

PCT Written Opinion of the International Searching Authority; Application No. PCT/US2009/048285; dated Jan. 27, 2010; 6 pages.

3GPP TSG CT WG1 Meeting #51; "Change Request"; C1-080382; Puerto Vallarta, Mexico; Jan. 28, 2008-Feb. 1, 2008; 3 pages.

3GPP TSG CT WG1 Meeting #51; "Timestamp in Register Request"; C1-080170; Puerto Vallarta, Mexico; Jan. 28, 2008-Feb. 1, 2008; 2 pages.

3GPP TSG CT WG1 Meeting #51; "Change Request"; C1-080171; Puerto Vallarta, Mexico; Jan. 28, 2008-Feb. 1, 2008; 2 pages.

3GPP TSG CTWG1 Meeting #53; "Enhancement of Filter Criteria for Third Party Registration and Other Requests" C1-081718; Capetown, South Africa; May 5-9, 2008; 8 pages.

ETSI TS 123 218 V7.8.0; Digital Cellular Telecommunications System (Phase 2+); Universal Mobile Telecommunications System (UMTS); IP Multimedia (IM) Session Handling; IM Call Model; Stage 2 (3GPP TS 23.218 version 7.8.0 Release 7); Jan. 2008; 62 pages.

Krishnamoorthy, Srini, et al.; "IMS Enhanced Filter and Action Criteria"; IP Multimedia Subsystem Architecture and Applications; 2007 International Conference; Dec. 6, 2007; 3 pages.

Sparks, R.; "Internet Media Type Message/Sipfrag"; RFC 3420; Nov. 2002; 9 pages.

Open Mobile Alliance; "Client Using Invite to Initiate Push Delivery"; OMA-CD-PUSH-2008-0065-CR_Client_using_INVITE_to-Initiate_Push_Delivery; Jun. 11, 2008; 4 pages.

Open Mobile Alliance; "Push Using SIP"; OMA-TS-SIP_Push-V1_0-20080416-D; Draft Version 1.0; Apr. 16, 2008; 51 pages.

Rosenberg, J.; "Obtaining and Using Globally Routable User Agent (UA) URIs (GRUU) in the Session Initiation Protocol (SIP)"; draft-ietf-sip-gruu-15; Oct. 11, 2007; 45 pages.

Kyzivat, P.; "Registration Event Package Extension for Session Initiation Protocol (SIP) Globally Routable User Agent URIs (GRUUs)"; draft-ietf-sipping-gruu-reg-event-09; Jul. 6, 2007; 18 pages.

Rosenberg, J.; "A Session Initiation Protocol (SIP) Event Package for Registrations"; RFC 3680; Mar. 2004; 30 pages.

Roach, A.B.; "Session Initiation Protocol (SIP)—Specific Event Notification"; RFC 3265; Jun. 2002; 43 pages.

Rosenberg, J. et al.; "SIP: Session Initiation Protocol; Network Working Group"; RFC 3261; Jun. 2002; 302 pages.

3GPP TS 23.228 V8.5.0; 3rd Generation Partnership Project; Technical Specification Group Services and System Aspects; IP Multimedia Subsystem (IMS); Stage 2; Release 8; Jun. 2008; 240 pages.

3GPP TS 24.229 V8.4.1; 3rd Generation Partnership Project; Technical Specification Group Core Network and Terminals; IP Multimedia Call Control Protocol Based on Session Initiation Protocol (SIP) and Session Description Protocol (SDP); Stage 3; Release 8; Jun. 2008; 518 pages.

3GPP TS 29.228 V8.2.0; 3rd Generation Partnership Project; Technical Specification Group Core Network and Terminals; IP Multimedia (IM) Subsystem Cx and Dx Interfaces; Signalling Flows and Message Contents; Release 8; Jun. 2008; 65 pages.

3GPP TS 29.229 V8.2.0; 3rd Generation Partnership Project; Technical Specification Group Core Network and Terminals; Cx and Dx Interfaces Based on the Diameter Protocol; Protocol Details; Release 8; Jun. 2008; 30 pages.

3GPP TS 24.229 V7.8.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 7; Jun. 2007; 423 pages.

3GPP TS 29.228 V7.8.0; 3rd Generation Partnership Project; Technical Specification Group Core Network and Terminals; IP Multimedia (IM) Subsystem Cx and Dx Interfaces; Signalling Flows and Message Contents; Release Dec. 7, 2007; 61 pages.

3GPP TS 23.218 V7.7.1; 3rd Generation Partnership Project; Technical Specification Group Core Network; IP Multimedia (IM) Session Handling; IM Call Model; Stage 2; Release 7; Jun. 2007; 59 pages.

(56) References Cited

OTHER PUBLICATIONS

3GPP TS 23.218 V8.0.0; 3rd Generation Partnership Project; Technical Specification Group Core Network; IP Multimedia (IM) Session Handling; IM Call Model; Stage 2; Release 8; Dec. 2007; 60 pages.
3GPP TS 24.229 V8.2.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 8; Dec. 2007; 473 pages.
IP.com; "IQQueryQuickExport—201904042043"; Apr. 4, 2019; 1 page.
IP.com; "IQQueryQuickExport—201904042041"; Apr. 4, 2019; 3 pages.
Office Action dated May 10, 2012; U.S. Appl. No. 12/361,382, filed Jan. 28, 2009; 50 pages.
Notice of Allowance dated Sep. 21, 2012; U.S. Appl. No. 12/361,382, filed Jan. 28, 2009; 15 pages.
Notice of Allowance dated Nov. 9, 2012; U.S. Appl. No. 12/361,382, filed Jan. 28, 2009; 13 pages.
Office Action dated Nov. 8, 2013; U.S. Appl. No. 13/680,789, filed Nov. 19, 2012; 20 pages.
Notice of Allowance dated Mar. 6, 2014; U.S. Appl. No. 13/680,789, filed Nov. 19, 2012; 19 pages.
Notice of Allowance dated Sep. 2, 2015; U.S. Appl. No. 14/298,604, filed Jun. 6, 2014; 20 pages.
Office Action dated Sep. 30, 2016; U.S. Appl. No. 14/992,720, filed Jan. 11, 2016; 19 pages.
Notice of Allowance dated Apr. 3, 2017; U.S. Appl. No. 14/992,720, filed Jan. 11, 2016; 9 pages.
Office Action dated Nov. 13, 2018; U.S. Appl. No. 15/658,091, filed Jul. 24, 2017; 30 pages.
Notice of Allowance dated Apr. 17, 2019; U.S. Appl. No. 15/658,091, filed Jul. 24, 2017; 15 pages.
Office Action dated Sep. 16, 2020; U.S. Appl. No. 16/514,756, filed Jul. 17, 2019; 30 pages.
Notice of Allowance dated Feb. 10, 2021; U.S. Appl. No. 16/514,756, filed Jul. 17, 2019; 9 pages.
PCT International Search Report; Application No. PCT/US2009/032270; dated Aug. 26, 2009; 4 pages.
PCT Written Opinion of the International Searching Authority; Application No. PCT/US2009/032270; dated Aug. 26, 2009 7 pages.
PCT International Preliminary Report on Patentability; Application No. PCT/US2009/032270; dated May 5, 2010; 9 pages.
European Examination Report; Application No. 09705233.6; dated Apr. 26, 2011; 4 pages.
European Examination Report; Application No. 09705233.6; dated May 31, 2012; 4 pages.
European Intent to Grant; Application No. 09705233.6; dated Nov. 26, 2012; 34 pages.
Canadian Office Action; Application No. 2,713,999; dated Mar. 12, 2013; 3 pages.
Chinese Office Action; Application No. 200980102953.6; dated Oct. 30, 2012; 23 pages.
Japanese Office Action; Application No. 2010-544480; dated Feb. 14, 2012; 6 pages.
Japanese Office Action; Application No. 2010-544480; dated Nov. 8, 2012; 7 pages.
Korean Office Action; Application No. 10-2010-7018432; dated Jul. 1, 2011; 7 pages.
Japanese Office Action; Application No. 2013-013951; dated Oct. 30, 2013; 5 pages.

\* cited by examiner

PROVIDING SESSION INITIATION PROTOCOL REQUEST CONTENTS METHOD AND SYSTEM

CROSS-REFERENCE TO RELATED APPLICATIONS

This application is a continuation of U.S. patent application Ser. No. 16/514,754 filed Jul. 17, 2019 by Andrew Michael Allen, et al., entitled "Providing Session Initiation Protocol Request Contents Method and System", U.S. Pat. No. 10,397,282 issued Aug. 27, 2019 by Andrew Michael Allen, et al., entitled "Providing Session Initiation Protocol Request Contents Method and System", which is a continuation of U.S. Pat. No. 9,723,029 issued on Aug. 1, 2017 entitled "Providing Session Initiation Protocol Request Contents Method and System", which is a continuation of U.S. Pat. No. 9,237,198 issued on Jan. 12, 2016 entitled "Providing Session Initiation Protocol Request Contents Method and System", which is a continuation of U.S. Pat. No. 8,787,371 issued on Jul. 22, 2014 entitled "Providing Session Initiation Protocol Request Contents Method and System", which is a continuation of U.S. Pat. No. 8,345,679 issued on Jan. 1, 2013 entitled "Providing Session Initiation Protocol Request Contents Method and System", which claims priority to and the benefit of U.S. Provisional Application No. 61/024,132, filed Jan. 28, 2008 by Andrew Michael Allen, et al., entitled "Providing SIP Request Contents Method and System", all of which are incorporated herein by reference as if reproduced in their entirety.

BACKGROUND

As used herein, the terms "user agent" and "UA" can refer to wireless devices such as mobile telephones, personal digital assistants, handheld or laptop computers, other user equipment "UE" and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar wireless capabilities but that are not transportable, such as telephones, desktop computers, set-top boxes, or network nodes. When a UA is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session. The terms UA and UE may be used interchangeably herein. The term SIP message can refer to a SIP response or a SIP request.

Each SIP entity is typically provided with a UA that may operate in two fashions: a User Agent Client (UAC) that generates request messages towards servers, and a User Agent Server (UAS) that receives request messages, processes them, and generates suitable responses. In some application scenarios, a single UA may function as both at a SIP entity, e.g., a UE device or a network node. In the most basic form, SIP uses six types (methods) of requests: INVITE, ACK, BYE, CANCEL, OPTIONS, and REGISTER. The INVITE request indicates a user or service is being invited to participate in a call session. The ACK request confirms that the client has received a final response to an INVITE request. The BYE request terminates a call/session and can be sent by either the caller or the callee. The CANCEL request cancels any pending searches but does not terminate a call/session that currently in progress. The OPTIONS request queries the capabilities of servers. The REGISTER request registers the address listed in the To: header field with a SIP server. As SIP can continue to evolve, a recipient may receive a method of request that it does not recognize. Such a method of request is handled as the UNKNOWN method of request.

In response to requests, SIP uses the following categories of responses: 1xx Informational Messages, 2xx Successful Responses, 3xx Redirection Responses, 4xx Request Failure Responses, 5xx Server Failure Responses, and 6xx General Failure Responses.

SIP messages are typically provided with a standardized message structure. FIG. 1 depicts the structure of an exemplary communication protocol message (e.g., a SIP message) having one initial line, one or more header fields, and a message body, where the message body possibly includes multiple body parts. A command line portion 12 identifies the initial line (e.g., a request line in requests and a status line in responses). A header portion 14 identifies one or more header fields 18-1 through 18-N that convey various pieces of information. One or more message body parts 20-1 through 20-M may be provided in a message body portion 16. As is well known, a message body is operable to hold any content such as plain text, coded images, or any information that may be rendered, e.g., in a Markup Language such as XML, HTML, etc. Each message body (or body part) is described using header fields such as, but not limited to, Content-Disposition, Content-Encoding, and Content-Type, etc., which provide information on its contents. Typically, the value of a Content-Type header field is a Multi-purpose Internet Mail Extensions (MIME) type.

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station, an LTE ENB, or any other that can provide a UA with access to other components in a telecommunications system. For packet data, the signal that carries data between a UA and an access device can have a specific set of frequency, time, and coding parameters and other characteristics that might be specified by the access device. A connection between a UA and an access device that has a specific set of such characteristics can be referred to as a resource. An access device typically establishes a different resource for each UA with which it is communicating at any particular time.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1xEV-DO, Worldwide Interoperability for Microwave Access (WiMAX), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. An example of an application-layer protocol that can be used in a packet switching wireless network is the Session Initiation Protocol (SIP). SIP has been standardized and governed primarily by the Internet Engineering Task Force (IETF). The IP (Internet Protocol) Multimedia Subsystem (IMS) is a packet switched technology that allows multimedia content that may include text, audio, and/or video portions to be transmitted between nodes.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method is provided for including information in a second Session Initiation Protocol (SIP) message from a network component to at least one of an application server and a user equipment. The information may have been obtained from a first SIP message. The method includes downloading to the network component filter criteria, determining whether the filter criteria include one or more indicators that specify the need to include the information, and including in the second SIP message the information specified by the filter criteria. The network component may also be configured or otherwise provisioned with the filter criteria in addition to or instead of downloading the filter criteria to the network component.

In an alternative embodiment, a component in a telecommunications network is provided that includes a processor configured to determine whether filter criteria include one or more indicators that specify a need for information from a first Session Initiation Protocol (SIP) message to be included in a second SIP message from the component to a user agent server. The processor is further configured to include in the second SIP message the information specified by the one or more indicators.

In an alternative embodiment, a user equipment is provided that includes a processor configured to receive a Session Initiation Protocol (SIP) Event Package that generates a SIP NOTIFY message transmitted by a network component as a result of a registration event. The SIP NOTIFY message contains at least a portion of information included in a first SIP message sent between another user equipment and the network component.

In an alternative embodiment, a method is provided for including information in a second Session Initiation Protocol (SIP) REGISTER request from a serving call session control function (S-CSCF) to at least one of an application server and a user equipment. The method includes downloading to the S-CSCF filter criteria including one or more indicators that specify the need for the information. The method further includes including in the second SIP REGISTER request the information specified by the filter criteria.

Figure 1:
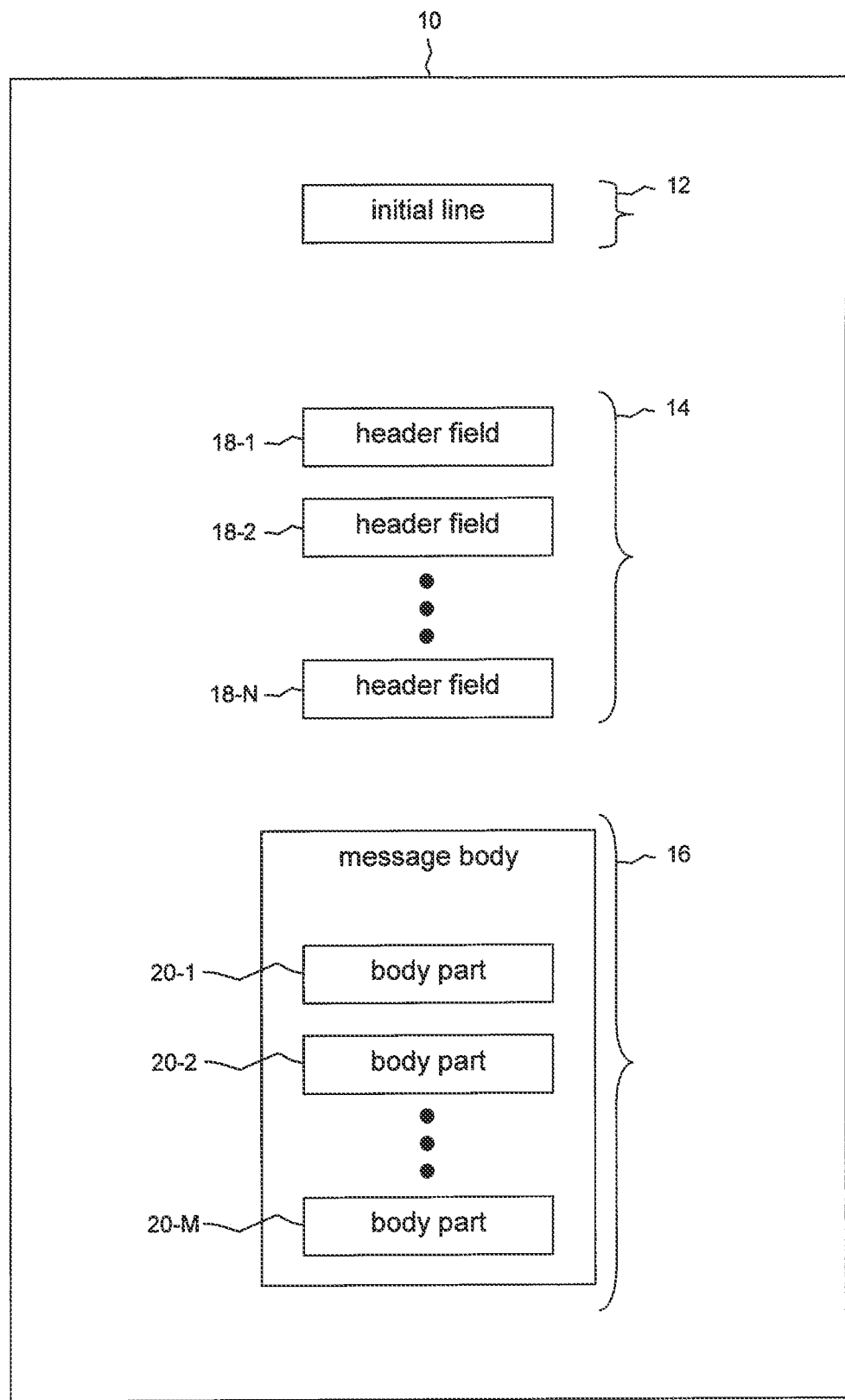
FIG. 1 is a diagram of a standardized message structure for a SIP message according to an embodiment of the disclosure.
Figure 2:
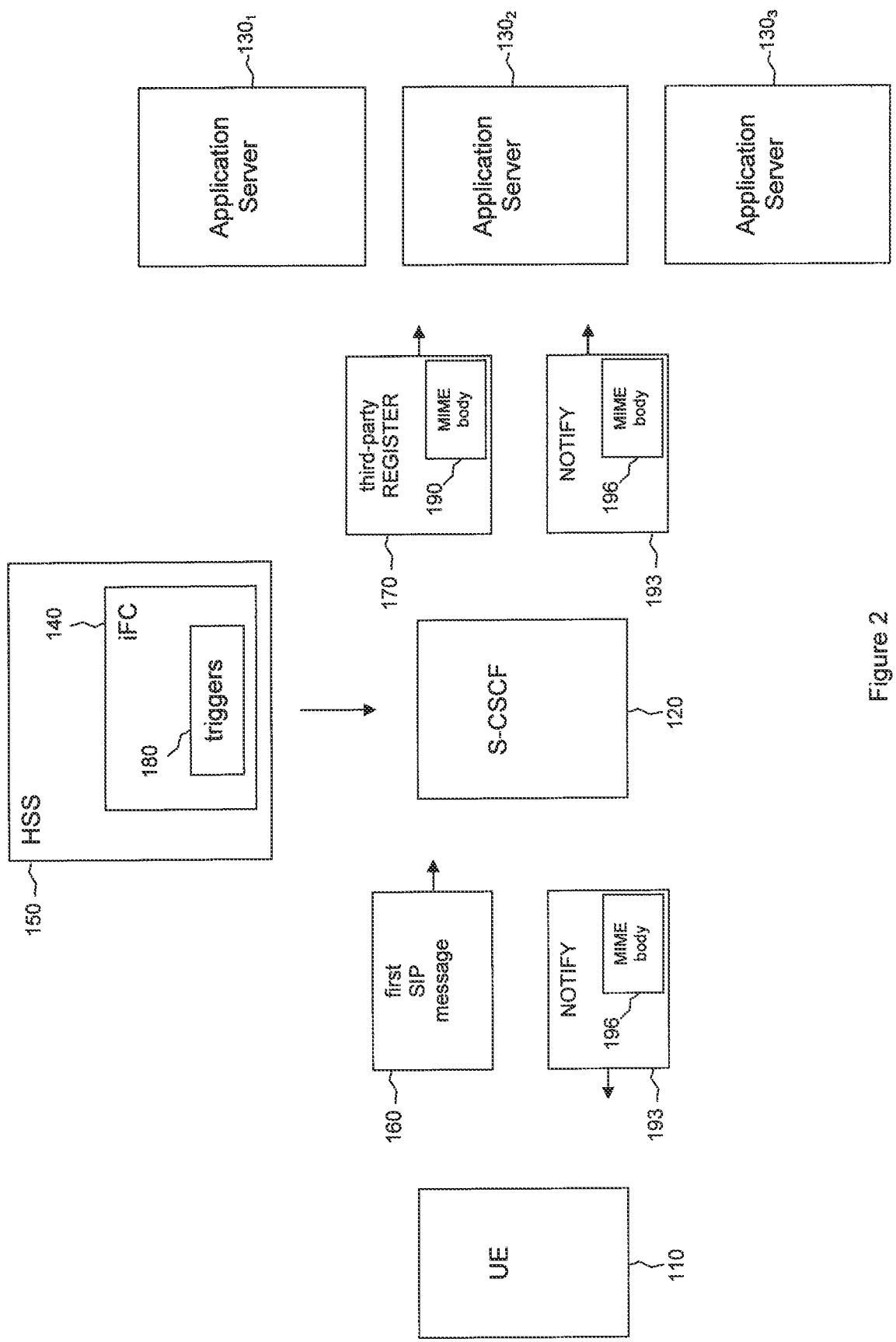
FIG. 2 is a diagram of a portion of an IMS architecture according to an embodiment of the disclosure.

The Third Generation Partnership Project (3GPP) has standardized the IP Multimedia Subsystem (IMS) as a next generation SIP/IP based network for multimedia services for mobile and landline networks. FIG. 2 illustrates a portion of the components that may be present in an IMS architecture. A UE 110 with IMS capabilities can request and receive IMS-based services. A serving call session control function (S-CSCF) 120 acts as a SIP registrar and as a service proxy to proxy SIP requests from the UE 110 to one or more application servers 130. As is well known in the art, the S-CSCF 120 might be a server, a virtual server, a stand-alone server with processor and memory, or might take some other form. The application servers 130 perform service logic for IMS services and applications such as multimedia telephony, voice call continuity, and personal network management. Although three application servers 130 are shown, other numbers of application servers could be present.

A set of initial filter criteria (iFC) 140 can be used to determine which SIP requests from the UE 110 are routed to which application servers 130. During the SIP registration procedure for the UE 110, the S-CSCF 120 downloads the iFC 140 from a home subscriber server (HSS) 150 or a similar component. The iFC 140 can contain a number of service point triggers (SPTs) that identify which application server 130 a request should be routed to. The S-CSCF 120 can also be configured or otherwise provisioned with the iFC 140; therefore, the S-CSCF 120 may not be required to download the iFC 140 during each SIP registration procedure. Furthermore, the S-CSCF 120 can include common sets of filter criteria that are used for sets of users, devices, types of sessions, etc. The common set(s) of filter criteria can be included in the iFC 140 or can be separate from the iFC 140. The common set(s) of filter criteria can be downloaded to the S-CSCF 120 and/or the S-CSCF 120 may be configured or otherwise provisioned with the common set(s) of filter criteria.

When the S-CSCF 120 receives a SIP REGISTER request from the UE 110, a third party registration can be performed based upon an indication included in the iFC 140. The third party registration procedure is a mechanism that enables the S-CSCF 120 to indicate to one or more of the application servers 130 that the UE 110 has registered and to indicate the uniform resource identifier (URI) of the S-CSCF 120 that is assigned to serve that UE 110. The third party registration procedure is not simply a proxying by the S-CSCF 120 of the UE's SIP REGISTER request to one of the application servers 130, because the UE's SIP REGISTER request terminates at the S-CSCF 120. Instead, a new SIP REGISTER request is sent from the S-CSCF 120 to one of the application servers 130, application server 130₂, for example.

The SIP REGISTER request sent from the UE 110 to the S-CSCF 120 can be referred to as the incoming REGISTER request 160, the original REGISTER request 160, the first SIP request 160, or the first SIP message 160. The SIP REGISTER request sent from the S-CSCF 120 to one or more of the application servers 130 can be referred to as the outgoing REGISTER request 170, the new REGISTER request 170, the third-party REGISTER request 170, the second SIP request, or the second SIP message. In some embodiments, the first and second SIP messages are not REGISTER requests, but could be SIP INVITE requests, SIP REFER requests, SIP MESSAGE requests, SIP SUBSCRIBE requests, SIP INFO requests, SIP PUBLISH requests, SIP NOTIFY requests, other SIP requests, or responses to any of these SIP requests. Also, as described below, the second SIP message, instead of or in addition to being the third-party REGISTER request 170, might be a SIP NOTIFY message 193 sent to one or more of the application servers 130 and/or to the user equipment 110.

In 3GPP IMS, the third party registration uses a SIP REGISTER request containing several header values. A "To" header can be set to the SIP URI of the user being registered. A "From" header can be set to the SIP URI of the S-CSCF 120. A "Contact" header can be set to the SIP URI of the S-CSCF 120 that the application server 130₂ should use to address requests destined for or sent on behalf of the UE 110 that has registered. A Call-ID header in the first SIP message 160 is normally different from the Call-ID header in the third-party SIP REGISTER request 170. A Request-URI parameter can contain the SIP URI of the application server 130₂.

For some SIP requests that the S-CSCF 120 proxies to the application server 130₂, such as SIP INVITE messages, the S-CSCF 120 includes in the outgoing messages all of the information that was included in the incoming messages, such as the SIP Request-URI, the SIP headers, and the SIP body. However, since the outgoing SIP REGISTER request 170 used in the third party registration procedure is a new request rather than the proxying of the incoming SIP REGISTER request 160, the full contents of the incoming SIP REGISTER request 160 are not included in the outgoing SIP REGISTER request 170. Since the Request-URI, and the To, From and Contact headers in the outgoing SIP REGISTER request 170 must have the values defined previously for the third party registration SIP REGISTER request, the values from the original SIP REGISTER request 160 from the UE 110 cannot be included in the same headers in the new SIP REGISTER request 170.

These headers from the original SIP REGISTER request 160 can contain information useful to the application server 130₂. For example, the Request-URI, and the To, From and Contact headers can contain URI parameters and header parameters as well as the original URIs used. The Contact header, for instance, can include media feature tags that indicate the UE's capabilities. These media feature tags cannot be included in the Contact header of the outgoing SIP REGISTER request 170 since this request 170 contains the URI of the S-CSCF 120, not the URI of the UE 110, and would thus indicate that those capabilities belonged to the S-CSCF 120 instead of to the UE 110.

Also, the incoming SIP REGISTER request 160 may include additional SIP headers, such as a timestamp header and a user agent header, that for various reasons should not be included in the outgoing SIP REGISTER request 170 as header fields of the SIP REGISTER request. Some headers cannot be included because their use in such a manner may not fit with their defined semantics and may violate the SIP protocol of simply copying the contents of the header from the original SIP REGISTER request 160 to the new SIP REGISTER request 170. Also, since it may be a service-specific issue whether the contents of a particular SIP header are to be included, including the contents could result in redundant information being received by application servers 130 that have no use for the information.

An event package for the S-CSCF 120 can provide other SIP entities (such as the application servers 130 and other IMS UEs) with information about the registration state. The registration event package can contain some of the contents included in the original requests such as Contact header parameters (e.g., media feature tags that indicate the UE's capabilities). However, the registration event package does not currently include all the headers of potential interest. Further, the SIP Subscribe/Notify mechanism that is used with the registration event package can consume excessive signaling overhead if the application server 130₂ or the UE 110 is only interested in a single header value in the SIP REGISTER request. In addition, when new extensions are made to the SIP protocol for SIP REGISTER/Registration (e.g., new headers and new parameters) the registration event package might need to be extended in order for this new information to be provided. Since an extension to the registration event package might require modifications to existing SIP standards, and any new services that required such an extension might entail upgrades to the S-CSCF 120, it may be unacceptable in terms of service deployment time scales to require an extension to the registration event package simply to create a new service.

Additionally, it may be a design objective to separate the IMS core infrastructure from the applications and services. That is, it may be preferable for the S-CSCF 120 to be application agnostic and to have no need to understand the services and applications. Therefore, it may be preferable that modifications to the S-CSCF 120 not be required in order to deploy new services and applications and that service and application specific behavior remain in the domain of the application servers 130 (and the client applications in the UE 110). Upgrading the existing core IMS infrastructure components with service-specific behavior in order for a new service to function properly could cause significant delays in the deployment of the new service.

In an embodiment, a generic solution to these problems is provided. New triggers 180 are defined in the iFC 140 that are separate from the existing service point triggers (SPTs). These new triggers 180, which can be referred to as <IncludeContentsTrigger> triggers, can identify information that needs to be included in the second SIP request 170. In some cases, one set of triggers 180 might be used when the second SIP request is the third-party REGISTER request 170, and another set of triggers 180 might be used when the second SIP request is the SIP NOTIFY message 193. In other cases, the same set of triggers might be used for both the third-party REGISTER request 170 and the SIP NOTIFY message 193.

Using the new triggers 180 in this manner can be contrasted with the use of existing SPTs in the iFC 140 to identify points of interest in a first SIP message that cause the S-CSCF 120 to send a SIP request to the appropriate application server 130. New services can be deployed using an existing S-CSCF 120 and other IMS infrastructure simply by adding a new application server 130 (or application server application), downloading a new client application to the UE 110, and configuring iFC data in the HSS 150 in order to reach the application. As mentioned previously, while the discussion herein focuses on the third party registration procedure, the mechanisms defined here are also suitable for other SIP messages (e.g., SIP INVITE, REFER, MESSAGE, SUBSCRIBE, NOTIFY, INFO, PUBLISH, etc.) between the S-CSCF 120 and the application servers 130 where the S-CSCF 120 acts as user agent or back-to-back user agent or performs third party call control.

In one embodiment, if a new trigger 180 identifies that information found in the first SIP message 160 should be included in the third-party REGISTER request 170, that information can be included directly as a SIP header of the third-party REGISTER request 170. The application server 130 can then obtain the service specific information from the header of interest included directly in the third-party REGISTER request 170. While a single third-party REGISTER request 170 has been described as being sent to a single application server 130, it should be understood that a plurality of third-party REGISTER requests 170 could be sent to a plurality of application servers 130, and each of the application servers 130 could obtain information from the third-party REGISTER requests 170.

As previously stated, it may not be possible to include directly all the headers from the first SIP message 160 in the third-party SIP REGISTER request 170. In another embodiment, information from the first SIP message 160 is included in the third-party SIP REGISTER request 170 through the inclusion of a multipurpose internet mail extension (MIME) body 190 that contains all or part of a SIP request or SIP response in the body of the third-party SIP REGISTER request 170. The application server 130 can then obtain the service specific information from the initial line, header fields or body (parts) of interest included in the MIME body 190 that contains all or part of a SIP request or SIP response in the body of the third-party SIP REGISTER request 170. Since the third-party SIP REGISTER request 170 could include another body as well (e.g., session description protocol or application/3gpp-service-info), the MIME body 190 that contains all or part of a SIP request or SIP response may be further encapsulated within a multipart mixed MIME body in the third-party SIP REGISTER request 170. In addition to SIP header fields, the Request-URI and the body of the first SIP request 160 can be included in the MIME body 190 that contains all or part of a SIP request or SIP response.

In an embodiment, the MIME body 190 that contains all or part of a SIP request or SIP response is a MIME body of content-type message/sipfrag.

In an embodiment, the iFC triggers 180 that indicate the information to be included in the third-party SIP REGISTER request 170 could contain a parameter that indicates whether the information is included as a SIP header or as the MIME body 190 that contains all or part of a SIP request or SIP response.

In an embodiment, the third-party SIP REGISTER request 170 includes a final response to the incoming REGISTER request 160.

In an embodiment where additional body content is included in the request or where both parts of the SIP request and SIP response are included in the request, the MIME bodies are further encapsulated in a multipart MIME body content-type.

The above solution can apply to the SIP REGISTER method and all other SIP messages. The following example shows the use of the MIME body 190 that contains all or part of a SIP request or SIP response in a REGISTER message.

1 REGISTER IMS UE→S-CSCF
REGISTER sip:registrar.biloxi.com SIP/2.0
Via: SIP/2.0/UDP bobspc.biloxi.com:5060; branch=z9hG4bKnashds7
Max-Forwards: 65
To: Bob <sip:bob@biloxi.com>
From: Bob <sip:bob@biloxi.com>;tag=456248
Call-ID: 843817637684230@998sdasdh09
CSeq: 1826 REGISTER
Timestamp: 54
Contact: <sip:bob@192.0.2.4>
Expires: 7200
Content-Length: 0
2 The S-CSCF downloads the User Profile including the Initial Filter Criteria from the HSS.
The S-CSCF responds with a 200 OK:
3 200 OK S-CSCF→IMS UE
SIP/2.0 200 OK
Via: SIP/2.0/UDP bobspc.biloxi.com:5060; branch=z9hG4bKnashds7;received=192.0.2.4
To: Bob <sip:bob@biloxi.com>;tag=2493k59kd
From: Bob <sip:bob@biloxi.com>;tag=456248
Call-ID: 843817637684230@998sdasdh09
CSeq: 1826 REGISTER
Contact: <sip:bob@192.0.2.4>;audio;video; mobility=mobile
Expires: 7200
Content-Length: 0
4 Filter Checking: The Initial Filter Criteria contains triggers that indicate that a Third Party Register should be sent to AS1 and that the following headers are to be included in a MIME body of content-type message/sipfrag:
Request-URI,
To,
From,
Contact,
Timestamp
5 REGISTER S-CSCF→AS
REGISTER sip:AS1.biloxi.com SIP/2.0

```
Via:       SIP/2.0/UDP       s-cscf1.biloxi.com:5060;
    branch=z9hG4bKnashds7
Max-Forwards: 70
To: Bob <sip:bob@biloxi.com>
From: <sip:s-cscf1.biloxi.com>;tag=678324
Call-ID: 3478906345
CSeq: 3421 REGISTER
Contact:           <sip:s-cscf1.biloxi.com>;audio;video;
    mobility=mobile
Expires: 7200
Content-Type: message/sipfrag;version=2.0
Content-Length: (..)
    REGISTER sip:registrar.biloxi.com SIP/2.0
    To: Bob <sip:bob@biloxi.com>
    From: Bob <sip:bob@biloxi.com>;tag=456248
    Contact:           <sip:bob@192.0.2.4>;audio;video;
        mobility=mobile
    Timestamp: 54
6 200 OK AS→S-CSCF
SIP/2.0 200 OK
Via:       SIP/2.0/UDP       s-cscf1.biloxi.com:5060;
    branch=z9hG4bKnashds7;received=192.0.2.4
To: Bob <sip:bob@biloxi.com>;tag=124809k79
From: <sip:s-cscf1.biloxi.com>;tag=
Call-ID: 3478906345
CSeq: 3421 REGISTER
Contact:           <sip:bob@192.0.2.4>;audio;video;
    mobility=mobile
Expires: 7200
Content-Length: 0
```

When a SIP registration occurs, a SIP NOTIFY message 193 containing a registration event package is typically sent to the UE 110, the application servers 130, and/or other SIP-based components as a notification of the registration state. In an embodiment, the SIP NOTIFY message 193 additionally includes at least a portion of the information that is included in the first SIP message 160 that triggered the SIP NOTIFY message 193. This portion of information is included in a MIME body 196 within the SIP NOTIFY message 193. In some embodiments, the MIME body 196 is directly included in the registration event package. In other embodiments, the MIME body 196 that includes the information is referred to by another MIME body in the SIP NOTIFY message 193. That is, the MIME body 196 that contains all or part of a SIP request or SIP response might be included directly in the registration event package in the SIP NOTIFY message 193. Alternatively, an additional but separate MIME body in the SIP NOTIFY message 193 might contain a reference to the MIME body 196 that contains all or part of a SIP request or SIP response. The parts of the SIP REGISTER request 160 that are included in the MIME body 196 that contains all or part of a SIP request or SIP response in the SIP NOTIFY message 193 can be determined based on the new triggers 180 in the iFC 140 as described above. The SIP NOTIFY 193 could be sent to the UE 110, the application servers 130, or some other SIP user agent or SIP terminal. The UE 110, application servers 130, or other SIP user agent or SIP terminal could then obtain the service-specific information from the SIP NOTIFY message 193.

Although these embodiments might require a one-time upgrade to the S-CSCF 120, these embodiments are general and are not service-specific. Once the S-CSCF 120 supports this new mechanism, new applications can obtain the information they need from the SIP messages (such as a SIP REGISTER request) simply by updating the iFC trigger data.

An example of extensible markup language (XML) code that might be used to implement the new triggers 180 is provided below. It should be understood that this code is provided only as an example and that various syntactic and structural modifications that provide similar results could be made. In this example, the first message triggering inclusion of information in the second SIP message is the REGISTER request, but similar considerations might apply to other SIP messages.

In this example, an <IncludeContentsTrigger> element contains a <Condition> element. A value of "Conditional" for the <Condition> element for a header indicates that if that header is included in the first SIP REGISTER request 160, that header is to be copied from the first SIP REGISTER request 160 into the third-party SIP REGISTER request 170 and/or the SIP NOTIFY message 193. A <Condition> element of "Unconditional" for a header indicates that, regardless of whether that header is included in the first request 160, the identified SIP header in the <SIPHeader> element is to be included with the contents specified in the <Content> element. In this example, the P-Service-Identity header is included unconditionally with Content "Service1".

If the <Content> element appears in an <IncludeContentsTrigger> element with a <Condition> element of "Conditional", it is an indication that the contents of the SIP header in the original request 160 need to match the contents specified in the <Content> element in order for the SIP header to be copied from the original SIP request 160 into the third-party SIP REGISTER request 170 and/or the SIP NOTIFY message 193. In this example, the P-Access-Network header is included conditionally when the content does not include "Home1.net".

A <ConditionNegated> element with a value of "1" indicates the negative of the Condition (logical NOT). A <Group> element associates an <IncludeContentsTrigger> element with an <SPT> trigger element. A <Body> element can assign a value to SIP body. An empty <Body> element in the conditional case indicates that the body of the incoming message is copied. Messages should be well-formed after processing; i.e., multi-part/mixed might need to be applied if multiple bodies are being included.

```
<IncludeContentsTrigger>
    <Group>0</Group>
    <R-URI>
        <Condition>UnConditional</Condition>
        <Disposition>SIPFrag</Disposition>
    </R-URI>
    <SIPHeader>
        <Condition>Conditional</Condition>
        <Header>Timestamp</Header>
        <Disposition>SIPFrag</Disposition>
    </SIPHeader>
    <SIPHeader>
        <Condition>Conditional</Condition>
        <ConditionNegated>1</ConditionNegated>
        <Header>P-Access-Network-Info</Header>
        <Content>home1.net</Content>
        <Disposition>SIPHeader</Disposition>
    </SIPHeader>
    <SIPHeader>
        <Condition>Unconditional</Condition>
        <Header>P-Service-Identity</Header>
        <Content>Service1</Content>
        <Disposition>SIPHeader</Disposition>
    </SIPHeader>
    <SIPHeader>
        <Condition>Unconditional</Condition>
```

```
<Header>Content-type</Header>
<Content>application/3gpp-ims+xml;sv="1"</Content>
<Header>Disposition-type</Header>
<Content>3gpp-service-info</Content>
<Body><3gpp-ims><service-info>6596327309hh398r
    </service-info><3gpp-ims><Body>
</SIPHeader>
<SIPHeader>
    <Condition>Conditional</Condition>
    <Header>Content-type</Header>
    <Content>application/3gpp-ims+xml;sv="1"</Content>
    <Header>Disposition-type</Header>
    <Content>3gpp-service-info</Content>
    <Body/>
</SIPHeader>
</IncludeContentsTrigger>
```

The following is an example of a notification of the registration event package containing a MIME body of content-type message/sipfrag.

```
NOTIFY sip: pnmas.home1.net SIP/2.0
Via: SIP/2.0/UDP scscf @home1.net; branch=z9hG4bK332b23.1
Max-Forwards: 70
From: <sip:scscf@home1.net>;tag=151170
To: <sip: pnmas.home1.net>;tag=31415
Call-ID: dre36d2v32gnlgiiomm72445
CSeq: 42 NOTIFY
Subscription-State: active;expires=600000
Event: reg
Content-Type: application/reginfo+xml
Contact: <sip:scscf@home1.net>
Content-Length: (...)
<?xml version="1.0"?>
<reginfo xmlns="urn:ietf:params:xml:ns:reginfo"
        xmlns:gr="urn:ietf:params:xml:ns:gruuinfo"
version="1" state="full">
    <registration aor="sip:PN_user1_public1@home1.net " id="a7" state="active">
        <contact id="76" state="active" event="registered">
            <uri>sip: [5555::aaa:bbb:ccc:ddd] </uri>
        <allOneLine>
            <unknown-param    name ="+ sip.instance"><urn:uuid:f81d4fae-7dec-11d0-a765-
00a0c91e6bf6>" </unknown-param>
            <unknown-param    name="+g.3gpp.app_ref">&urn:urn-xxx:gpp-service.ims.icsi.mmtel>"
</unknown-param>
            <unknown-param name="+g.3ggg.cs-audio"> </unknown-param>
            <unknown-param name="+g.3ggg.cs-video"> </unknown-param>
        </allOneLine>
            <allOneLine>
            <gr:pub-gruu  uri="sip:PN_user1_public1@home1.net;gr=urn:uuid:f81d4fae-7dec-11d0-a765-
00a0c91e6bf6"/>
            </allOneLine
                <gr:temp-gruu uri="sip:8ffkas08af7fasklzi9@home1.net;gr" first-cseq-"40"/>
            </contact>
        </registration>
    <registration aor="sip:user1_public2@home1.net" id="a8" state="active">
        <contact id="77" state="active" event="created">
            <uri>sip: [5555::aaa:bbb:ccc:ddd] </uri>
        <allOneLine>
            <unknown-param            name="+ sip.instance"><urn:uuid:f81d4fae-7dec-11d0-a765-
00a0c91e6bf6>" </unknown-param>
            <unknown-param            name="+g.3gpp.app_ref">&urn:urn-xxx:gpp-service.ims.icsi.mmtel>"
</unknown-param>
            <unknown-param name="g.3ggg.cs-audio"> </unknown-param>
            <unknown-param name="g.3ggg.cs-video"> </unknown-param>
        </allOneLine>
        <allOneLine>
            <gr:pub-gruu         uri="sip:PN_user1_public2@home1.net;gr=urn:uuid:f81d4fae-7dec-11d0-a765-
00a0c91e6bf6"/>
        </allOneLine
            <gr:temp-gruu uri="sip:2k3e8farf7flfka9zi9@home1.net;gr" first-cseq="40"/>
            <sip-frag>
        REGISTER sip: sip:user1_public2@home1.net SIP/2.0
        Via: SIP/2.0/UDP pcscf. home1.net:5060;branch=z9hG4bKnashds7
        Max-Forwards: 65
        To: Bob <sip:user1_public2@home1.net>
        From: Bob <sip:user1_public2@home1.net>;tag=456248
        Call-ID: 843817637684230@998sdasdh09
        Supported: gruu
        CSeq: 1826 REGISTER
            Timestamp: 54
        Contact:<sip: [5555::aaa:bbb:ccc:ddd] >;+sip.instance=    urn:uuid:f81d4fae-7dec-11d0-a765-
00a0c91e6bf6
        Expires: 7200
        Content-Length: 0
```

```
        </sip-frag>
      </contact>
    </registration>
</reginfo>
```

Figure 3:
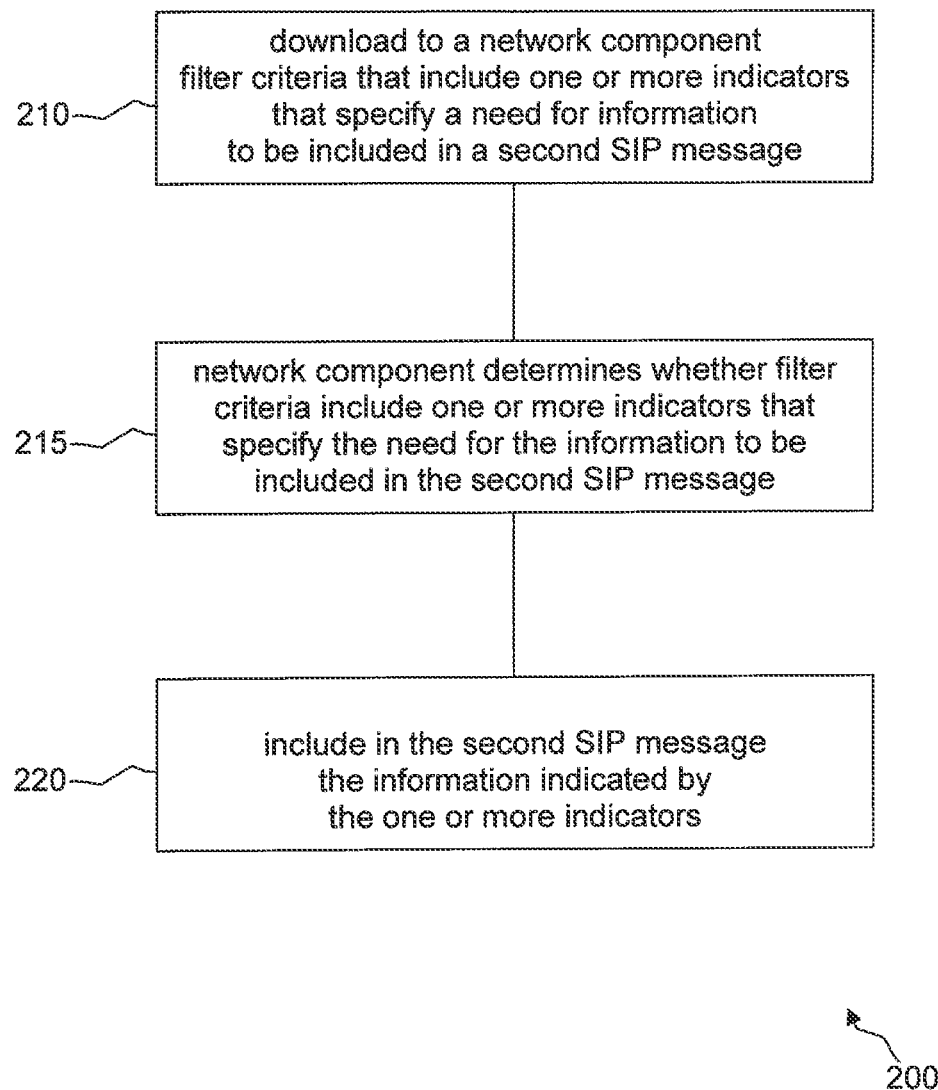
FIG. 3 is a diagram of a method for including information in a SIP message from a network component to an application server and/or a user equipment according to an embodiment of the disclosure.

FIG. 3 illustrates an embodiment of a method 200 for including information in a second SIP message from a network component to an application server and/or a user equipment. In block 210, filter criteria including one or more indicators that specify the need for the information to be included in the second SIP message are downloaded to the network component and/or the network component is configured or otherwise provisioned with the filter criteria including one or more indicators that specify the need for the information to be included in the second SIP message. In block 215, the network component determines whether the filter criteria include one or more indicators that specify the need for the information to be included in the second SIP message. In block 220, the information indicated by the one or more indicators is included in the second SIP message.

In some embodiments, when a service information XML element is provided in the filter criteria for the application server, the S-CSCF includes the service information in the third-party REGISTER request body in a <service-info> XML element and sets the value of the content type to a MIME type.

In some embodiments, when more than one message body is included in the third-party REGISTER request, the S-CSCF includes in the third-party REGISTER request a multipart message body, sets the value of the Content-Type header to "multipart/mixed", and sets the Content-Type of the elements of the MIME body to the content type specified for the body.

In some embodiments, when only one message body is included in the third-party REGISTER request, the S-CSCF sets the Content-Type header field to the content type specified for the body.

Figure 4:
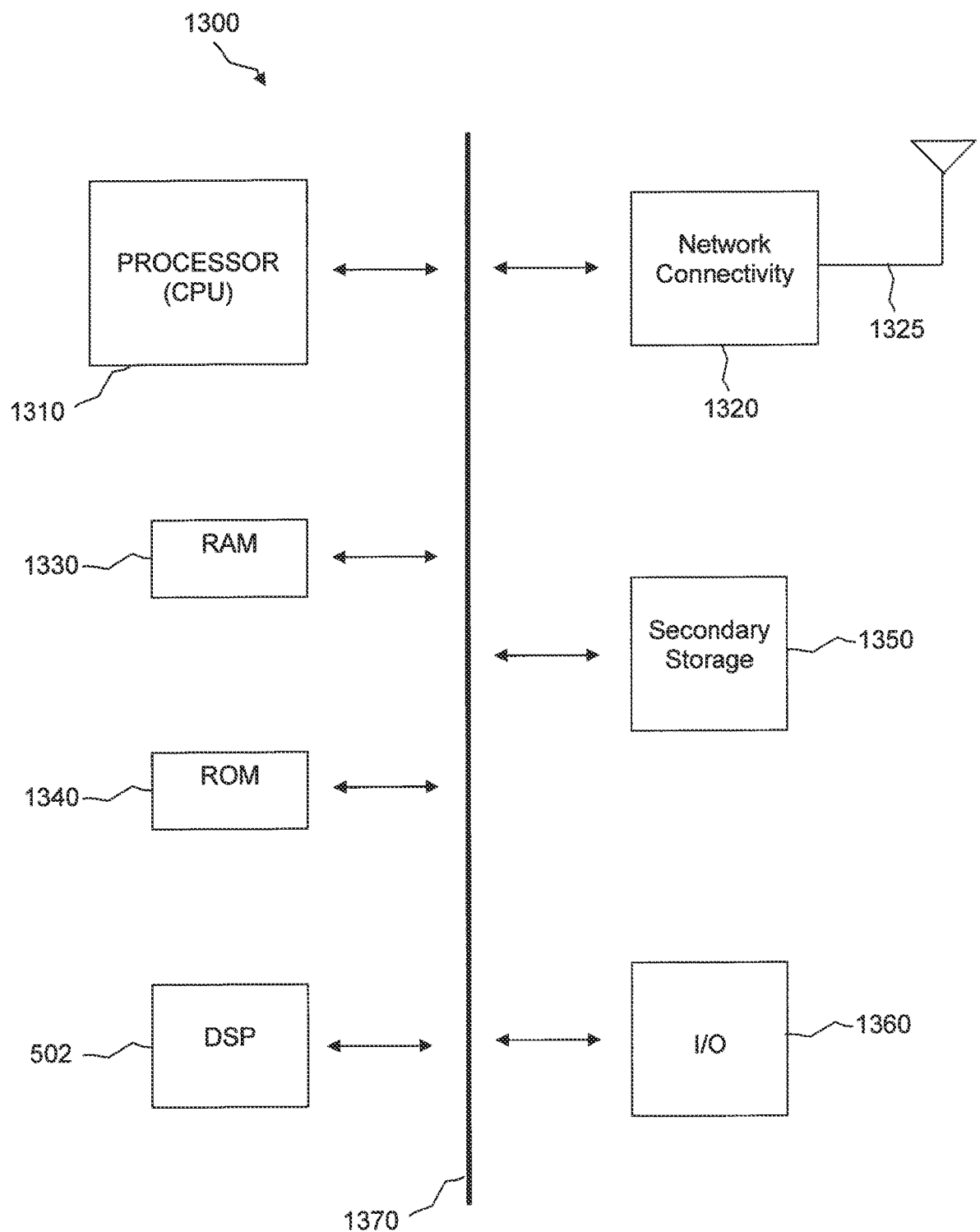
FIG. 4 illustrates a processor and related components suitable for implementing the several embodiments of the present disclosure.

The UE 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as the DSP 502 described above. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following 3rd Generation Partnership Project (3GPP) Technical Specifications (TS) are incorporated herein by reference: TS 23.218 V7.7.1 (2007-06), TS 23.228 V7.9.0 (2007-09), TS 24.229 V7.8.0 (2007-12), TS 29.228 V7.10.0 (2007-12), and TS 29.229 V7.7.0 (2007-12). Also incorporated herein by reference is "SIP: Session Initiation Protocol", RFC 3261, June 2002, and RFC 3265, RFC 3680, and RFC 3420.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A Call Session Control Function (CSCF) for providing information regarding a first entity, the CSCF comprising:
   a processor configured to send a session initiation protocol (SIP) message to a second entity, the SIP message including a message,
   wherein the message comprises a first request uniform resource identifier (Request URI), the first Request URI comprising a SIP registrar address, and wherein the SIP message comprises a second Request URI, the second Request URI comprising an address of the second entity.

2. The CSCF of claim 1, wherein the second entity comprises an application server (AS).

3. The CSCF of claim 1, wherein the SIP message is a SIP NOTIFY message containing a registration event package transmitted as a result of a registration event.

4. The CSCF of claim 1, wherein the message includes at least an initial line and a header field.

5. The CSCF of claim 1, wherein the message is sent from the CSCF or received by the CSCF.

6. The CSCF of claim 1, wherein the message is a copy of a SIP 200 OK message sent by the first entity or the second entity.

7. The CSCF of claim 1, wherein the SIP message comprises a Multi-purpose Internet Mail Extensions (MIME) body including at least one of a SIP Register message as a whole or a SIP Response message as a whole.

8. A method for providing information regarding a first entity, the method comprising:
   sending, by a Call Session Control Function (CSCF), a session initiation protocol (SIP) message to a second entity, the SIP message including a message,
   wherein the message comprises a first request uniform resource identifier (Request URI), the first Request URI comprising a SIP registrar address, and wherein the SIP message comprises a second Request URI, the second Request URI comprising an address of the second entity.

9. The method of claim 8, wherein the second entity comprises an application server (AS).

10. The method of claim 9, wherein the message includes at least an initial line and a header field, and wherein the AS is configured to obtain the information from the initial line or the header field.

11. The method of claim 8, wherein the SIP message is a SIP NOTIFY message containing a registration event package transmitted as a result of a registration event.

12. The method of claim 8, wherein the message is sent from the CSCF or received by the CSCF.

13. The method of claim 8, wherein the message is a copy of a SIP 200 OK message sent by the first entity or the second entity.

14. The method of claim 8, wherein the SIP message comprises a Multi-purpose Internet Mail Extensions (MIME) body including at least one of a SIP Register message as a whole or a SIP Response message as a whole.

15. A non-transitory computer readable medium storing computer readable instructions executable by a processor to implement a method for providing information regarding a first entity, the method comprising:
   sending, by a Call Session Control Function (CSCF), a session initiation protocol (SIP) message to a second entity, the SIP message including a message,
   wherein the message comprises a first request uniform resource identifier (Request URI), the first Request URI comprising a SIP registrar address, and wherein the SIP message comprises a second Request URI, the second Request URI comprising an address of the second entity.

16. The non-transitory computer readable medium of claim 15, wherein the second entity comprises an application server (AS).

17. The non-transitory computer readable medium of claim 16, wherein the message includes at least an initial line and a header field, and wherein the AS is configured to obtain the information from the initial line or the header field.

18. The non-transitory computer readable medium of claim 15, wherein the SIP message is a SIP NOTIFY message containing a registration event package transmitted as a result of a registration event.

19. The non-transitory computer readable medium of claim 15, wherein message is sent from the CSCF or received by the CSCF.

20. The non-transitory computer readable medium of claim 15, wherein the SIP message comprises a Multi-purpose Internet Mail Extensions (MIME) body including at least one of a SIP Register message as a whole or a SIP Response message as a whole.

* * * * *